(12) United States Patent
Wang

(10) Patent No.: US 10,560,520 B2
(45) Date of Patent: Feb. 11, 2020

(54) COMPATIBILITY FRAMEWORK FOR CLOUD AND ON-PREMISE APPLICATION INTEGRATION

(71) Applicant: SAP SE, Walldorf (DE)

(72) Inventor: Chongyao Wang, Shanghai (CN)

(73) Assignee: SAP SE, Walldorf (DE)

( * ) Notice: Subject to any disclaimer, the term of this patent is extended or adjusted under 35 U.S.C. 154(b) by 159 days.

(21) Appl. No.: 15/160,084

(22) Filed: May 20, 2016

(65) Prior Publication Data
US 2017/0339221 A1    Nov. 23, 2017

(51) Int. Cl.
*H04L 29/08* (2006.01)
*G06F 9/50* (2006.01)

(52) U.S. Cl.
CPC ........ *H04L 67/1014* (2013.01); *G06F 9/5072* (2013.01); *H04L 67/02* (2013.01); *H04L 67/1097* (2013.01); *H04L 67/34* (2013.01)

(58) Field of Classification Search
CPC . H04L 67/1014; H04L 41/0859; H04L 67/02; H04L 67/34
USPC ........................................ 709/203
See application file for complete search history.

(56) References Cited

U.S. PATENT DOCUMENTS

| | | | | |
|---|---|---|---|---|
| 7,949,999 B1 * | 5/2011 | Willeford | ................. | G06F 8/67 717/101 |
| 9,081,761 B1 * | 7/2015 | Little | ................. | G06F 17/3064 |
| 9,350,819 B2 * | 5/2016 | Bhagavatula | ........... | H04L 67/26 |
| 2004/0055005 A1 * | 3/2004 | Creswell | ................. | G06F 8/71 719/315 |
| 2011/0321028 A1 * | 12/2011 | Evans | ................. | G06F 8/68 717/170 |

(Continued)

*Primary Examiner* — Joseph L Greene
(74) *Attorney, Agent, or Firm* — Schwegman Lundberg & Woessner, P.A.

(57) ABSTRACT

Systems and methods are described herein for receiving, by a server computer associated with a cloud-based application, a request via a network from a requesting device associated with an on-premise application, for at least one feature associated with an application service provided by the cloud-based application, the request including a requester identifier and a requested feature identifier, determining, by the server computer associated with the cloud-based application, a version identifier for the request based on the requester identifier, accessing, by the server computer associated with the cloud-based application, instructions for the cloud-based application which include instructions associated with a plurality of version identifiers, each version identifier associated with at least one feature identifier, parsing, by the server computer associated with the cloud-based application, the instructions for the cloud-based application to determine a subset of instructions associated with the version identifier of the request and the requested feature identifier, executing, by the server computer associated with the cloud-based application, the subset of instructions associated with the version identifier of the request and the requested feature identifier, and returning, by the server computer associated with the cloud-based application, a response to the requesting device via the network, indicating that at least one feature associated with the application service provided by the cloud-based application has been executed.

20 Claims, 7 Drawing Sheets

(56) References Cited

U.S. PATENT DOCUMENTS

| | | | | |
|---|---|---|---|---|
| 2014/0033312 A1* | 1/2014 | Spiegler | ............... | G06F 21/10 |
| | | | | 726/26 |
| 2014/0164479 A1* | 6/2014 | Vano Newman | ....... | H04L 67/02 |
| | | | | 709/203 |
| 2015/0334182 A1* | 11/2015 | Wu | ................. | H04L 67/1095 |
| | | | | 707/620 |
| 2017/0048339 A1* | 2/2017 | Straub | ................. | H04L 67/22 |
| 2017/0322934 A1* | 11/2017 | Chen | ............... | G06F 17/3023 |

\* cited by examiner

COMPATIBILITY FRAMEWORK FOR CLOUD AND ON-PREMISE APPLICATION INTEGRATION

TECHNICAL FIELD

The present disclosure relates generally to a compatibility framework for cloud and on-premise application integration.

BACKGROUND

Cloud-based applications, using a network of remote servers to store, manage, and process data, are becoming more and more desirable over traditional on-premise applications that store, manage, and process data on local or personal computers. Some on-premise applications are integrated with cloud-based applications. One problem with these integrated solutions is that they may have different release cycles. For example, the cloud-based application may deploy updates every week while an administrator of an on-premise application may only want to update the integrated on-premise application quarterly or bi-annually to manage change and cost on local computers. The complexity grows when there are many on-premise applications at various stages of updates, with most of the on-premise applications at different versions from each other and from the cloud-based application.

BRIEF SUMMARY

In some implementations, methods and apparatus, including computer program products, provide a compatibility framework for cloud and on-premise application integration. In one aspect, a server computer associated with a cloud-based application, may receive a request via a network from a requesting device associated with an on-premise application, for at least one feature associated with an application service provided by the cloud-based application, the request including a requester identifier and a requested feature identifier. The server computer associated with the cloud-based application, may determine a version identifier for the request based on the requester identifier, and instructions for the cloud-based application which include instructions associated with a plurality of version identifiers, each version identifier associated with at least one feature identifier. The instructions for the cloud-based application may be parsed by the server computer, to determine a subset of instructions associated with the version identifier of the request and the requested feature identifier. The server computer may execute the subset of instructions associated with the version identifier of the request and the requested feature identifier and return a response to the requesting device via the network, indicating that at least one feature associated with the application service provided by the cloud-based application has been executed.

The above methods, apparatus, and computer program products may, in some implementations, further include one or more of the following features. Storing, in the instructions for the cloud-based application, a new subset of instructions associated with a new feature identifier and a new version identifier. Storing, in the instructions for the cloud-based application, a new subset of instructions associated with at least one enhancement to an existing feature with an existing feature identifier and an existing version identifier, and associating the new subset of instructions with the existing feature identifier and a new version identifier. The at least one enhancement may include a bug fix to the instructions associated with the existing feature or additional functionality to the instructions associated with the existing feature. The existing feature identifier associated with the existing version identifier may be updated to indicate that the existing feature is obsolete in instructions with later version identifiers. Determining a version identifier for the request based on the requester identifier may comprise comparing the requester identifier to requester identifiers in a database to determine the version identifier associated with the requester identifier. The request may be received via HyperText Transport Protocol Secure (HTTPS).

The details of one or more variations of the subject matter described herein are set forth in the accompanying drawings and the description below. Other features and benefits of the subject matter described herein will be apparent from the description and drawings, and from the claims.

BRIEF DESCRIPTION OF THE DRAWINGS

Various ones of the appended drawings merely illustrate example embodiments of the present disclosure and should not be considered as limiting its scope.

DETAILED DESCRIPTION

Systems and methods described herein relate to providing a compatibility framework for cloud and on-premise application integration. As explained above, some on-premise applications are integrated with cloud-based applications. For example, some entities may want to slowly migrate from an on-premise only application solution, to a cloud-based only application solution. In another example, some entities may not be able to utilize a cloud-based only application due to regulatory compliance or security and privacy issues. For instance, some data may be required to remain within an enterprise firewall for regulatory compliance, and these restrictions may not allow an entity to utilize a full cloud-based only application. Also, an entity may be concerned with sensitive data being stored in the cloud instead of keeping sensitive data on-premises. To address such issues, an integrated approach may be taken where an entity may install an application locally and still utilize the application functionality via the cloud-based application. This integrated approach, however, introduces a number of technical challenges. For example, the cloud-based application may deploy updates more frequently than is desired by an administrator on an on-premise application. In one example the cloud-based application may deploy updates weekly, or even daily, while an administrator of an on-premise application may only want to update the integrated on-premise application quarterly or bi-annually to manage change and cost on local computers. Managing multiple versions of cloud-based applications and on-premise applications can get incredibly complicated when each entity is using a different version of the application, especially in larger systems where there may be hundreds of entities.

Accordingly, embodiments described herein provide a compatibility framework for cloud and on-premise application integration. In one example, one code base is maintained to support all on-premise application versions. This one code base is utilized to service requests from on-premise applications, regardless of what version the on-premise application supports.

Figure 1:
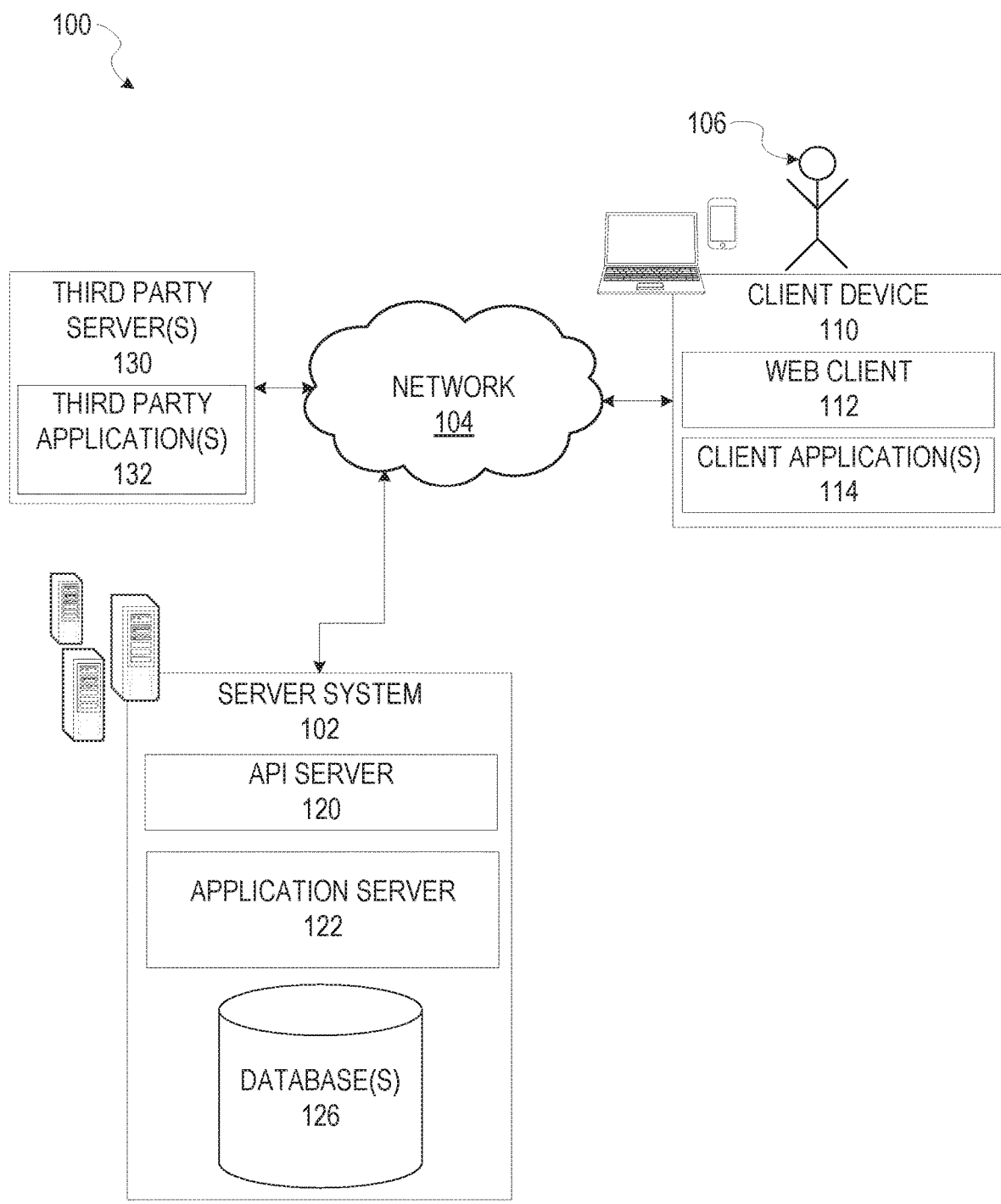
FIG. 1 is a block diagram illustrating a networked system, according to some example embodiments, configured to manage compatibility of integrated on-premise and cloud-based applications.

FIG. 1 is a block diagram illustrating a networked system 100, according to some example embodiments, configured to manage compatibility of integrated on-premise and cloud-based applications. The system 100 includes one or more client devices such as a client device 110. The client device 110 may comprise, but is not limited to, a mobile phone, desktop computer, laptop, portable digital assistants (PDAs), smart phones, tablets, ultra books, netbooks, laptops, multi-processor systems, microprocessor-based or programmable consumer electronics, game consoles, set-top boxes, computers in vehicles, or any other communication device that a user may utilize to access the networked system 100. In some embodiments, the client device 110 may comprise a display module (not shown) to display information (e.g., in the form of user interfaces). In further embodiments, the client device 110 may comprise one or more of touch screens, accelerometers, gyroscopes, cameras, microphones, global positioning system (GPS) devices, and so forth.

The client device 110 may be a device of a user that is used to search and display information, purchase services or products, etc. In one example embodiment, the system 100 is an ecommerce system that utilizes on-premise ecommerce software on third-party servers as well as ecommerce services and functionality of a cloud-based system such as server system 102.

One or more users 106 may be a person, a machine, or other means of interacting with the client device 110. In example embodiments, the user 106 may not be part of the system 100, but may interact with the system 100 via the client device 110 or other means. For instance, the user 106 may provide input (e.g., touch screen input or alphanumeric input) to the client device 110 and the input may be communicated to other entities in the system 100 (e.g., third party server(s) 130, server system 102, etc.) via the network 104. In this instance, the other entities in the system 100, in response to receiving the input from the user 106, may communicate information to the client device 110 via the network 104 to be presented to the user 106. In this way, the user 106 may interact with the various entities in the system 100 using the client device 110.

The system 100 includes a network 104. One or more portions of network 104 may be an ad hoc network, an intranet, an extranet, a virtual private network (VPN), a local area network (LAN), a wireless LAN (WLAN), a wide area network (WAN), a wireless WAN (WWAN), a metropolitan area network (MAN), a portion of the Internet, a portion of the Public Switched Telephone Network (PSTN), a cellular telephone network, a wireless network, a WiFi network, a WiMax network, another type of network, or a combination of two or more such networks.

The client device 110 may access the various data and applications provided by other entities in the system 100 via web client 112 (e.g., a browser, such as the Internet Explorer® browser developed by Microsoft® Corporation of Redmond, Wash. State) or one or more client applications 114. The client device 110 may include one or more client applications 114 (also referred to as "apps") such as, but not limited to, a web browser, messaging application, electronic mail (email) application, an ecommerce site application, a mapping or location application, and the like. In some embodiments, one or more applications 114 may be included in a given one of the client device 110, and configured to locally provide the user interface and at least some of the functionalities of the application. The client application(s) 114 may be configured to communicate with other entities in the system 100 (e.g., third party server(s) 130, server system 102, etc.), on an as-needed basis, for data and/or processing capabilities not locally available (e.g., to access location information, to authenticate a user 106, to verify a method of payment, etc.). Conversely, one or more client applications 114 may not be included in the client device 110, and then the client device 110 may use its web browser to access the one or more applications hosted on other entities in the system 100 (e.g., third party server(s) 130, server system 102, etc.).

A server system 102 may provide server-side functionality via the network 104 (e.g., the Internet or wide area network (WAN)) to one or more third party server(s) 130 and/or one or more client device 110. The server system 102 may include an application program interface (API) server 120 and an application server 122 that may be communicatively coupled with one or more database(s) 126. Database(s) 126 may be storage devices that store information such as third-party information, requester identifiers, version identifiers, etc. The server system 102 may be a cloud computing environment according to some example embodiments. The server system 102, and any servers associated with the server system 102, may be associated with a cloud-based application, in one example embodiment.

The system 100 further includes one or more third party server(s) 130. The one or more third party server(s) 130 may include one or more third party application(s) 132. The one or more third party application(s) 132, executing on third party server(s) 130, may interact with the server system 102 via API server 120 via a programmatic interface provided by the API server 120. For example, one or more the third party application(s) 132 may request and utilize information from the server system 102 via the API server 120 to support one or more features or functions on a website hosted by the third party or an application hosted by the third party. The third party website or application(s) 132, for example, may provide ecommerce services and features that are supported by relevant functionality and data in the server system 102.

As explained above, there are many technical challenges to managing on-premise applications that are integrated with a cloud-based application. For example, an entity (e.g., a business or individual that provides application services to end users) may install a version of the application locally (e.g., on one or more server computer associated with the entity (e.g., third party server(s) 130)) and the application installed locally may utilize application services provided by an application running in the cloud (e.g., server system 102). In one example, the application installed locally may comprise a widget that can be used to access and utilize application services provided by the application running in the cloud. One technical issue is that the on-premise application and the cloud-based application may have different release cycles. For example, the cloud-based application may deploy updates weekly or even daily, while an administrator of an on-premise application may only want to update the integrated on-premise application quarterly or bi-annually to manage change and cost on local computers. The complexity grows when there are many on-premise applications at various stages of updates, with most of the on-premise applications at different versions from each other and from the cloud-based application. A simple example of this scenario is illustrated in FIGS. 2A-2C.

Figure 2A:
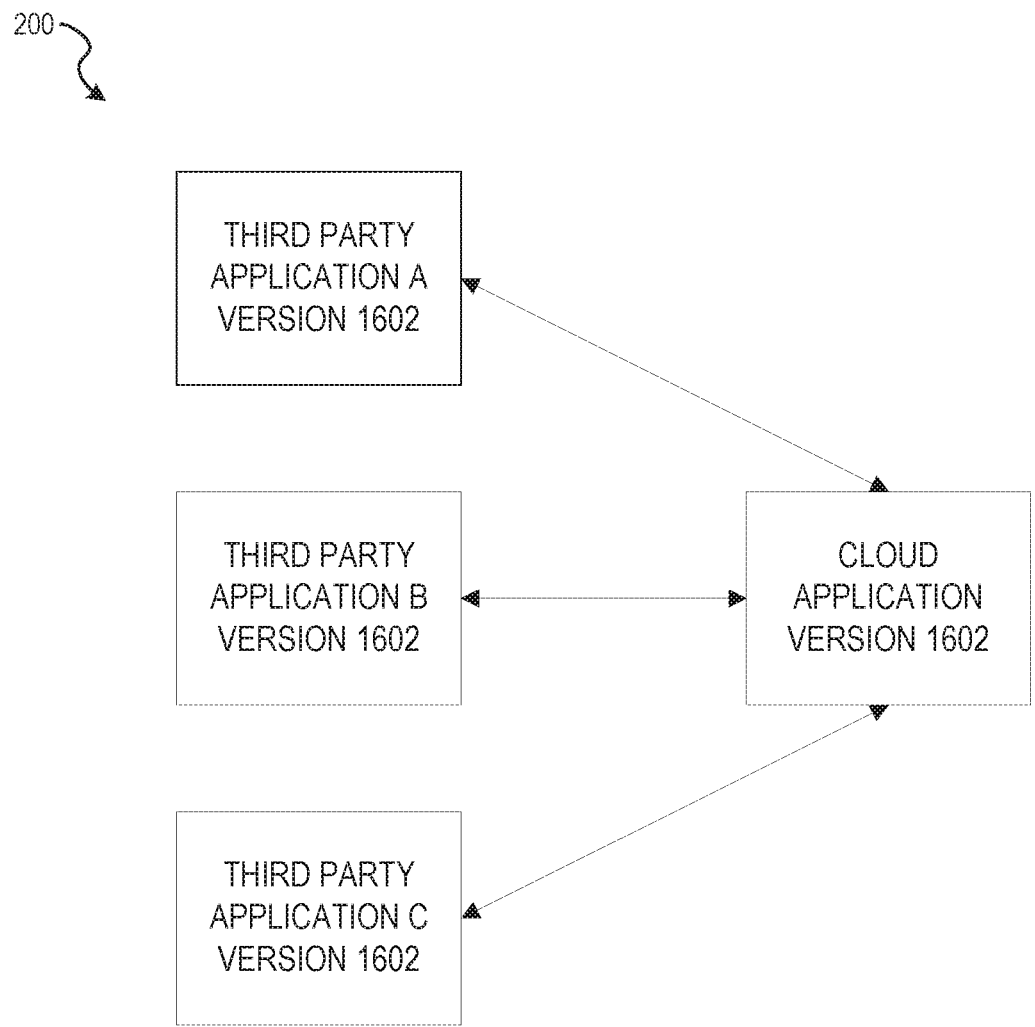
FIGS. 2A-2C illustrate the complexity of various on-premise applications at various stages of updates, according to some example embodiments.

FIG. 2A shows an initial release of an application. In this example, the initial release is version 1602. Since it is the first release, the third party servers that have installed the application (e.g., third party application A, third party application B, third party application C) are all using the initial version 1602 and the cloud application version is also version 1602. In example embodiments, each third party application may be associated with a different third party entity. For instance, third party application A may be associated with third party entity A, third party application B may be associated with third party entity B, third party application C may be associated with third party entity C, and so forth. An entity may be a company or an individual that provides application services to end users (e.g., via client device(s) 110). The third party application may be installed on one or more third party server(s) 130 and/or may be installed on one or more client device(s) 110 or may be utilized by client application(s) 114.

Figure 2B:
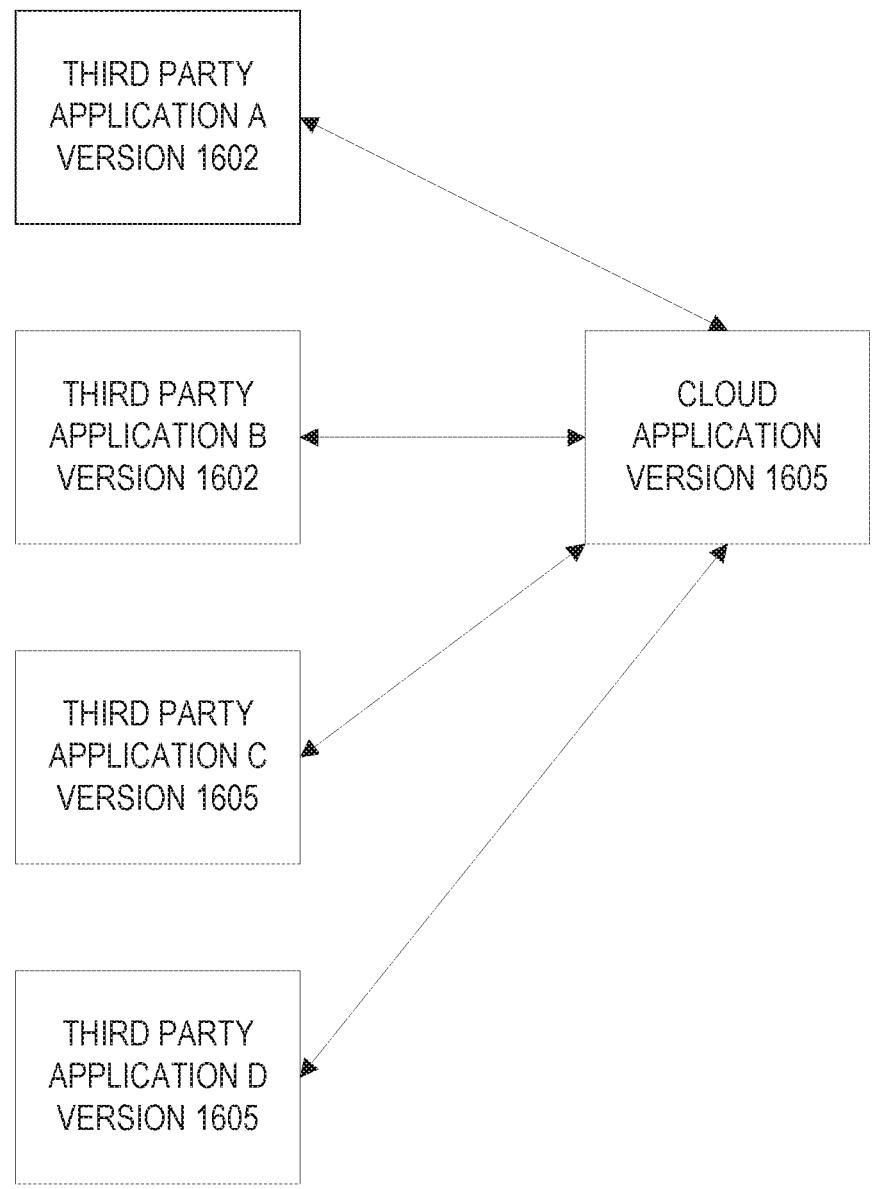

FIG. 2B shows that a new version 1605 has been released. The cloud application contains the instructions for the latest version 1605. The administrator for third party application A and the administrator for third party application B do not choose to upgrade to the latest version. For example, the administrator for third party application A and the administrator for third party application B may only choose to update to a new application version every quarter, half year, year, etc. The administrator for third party application C does choose to update to the new version 1605. And a new third party application D has installed the application and thus also has the latest version 1605.

Figure 2C:
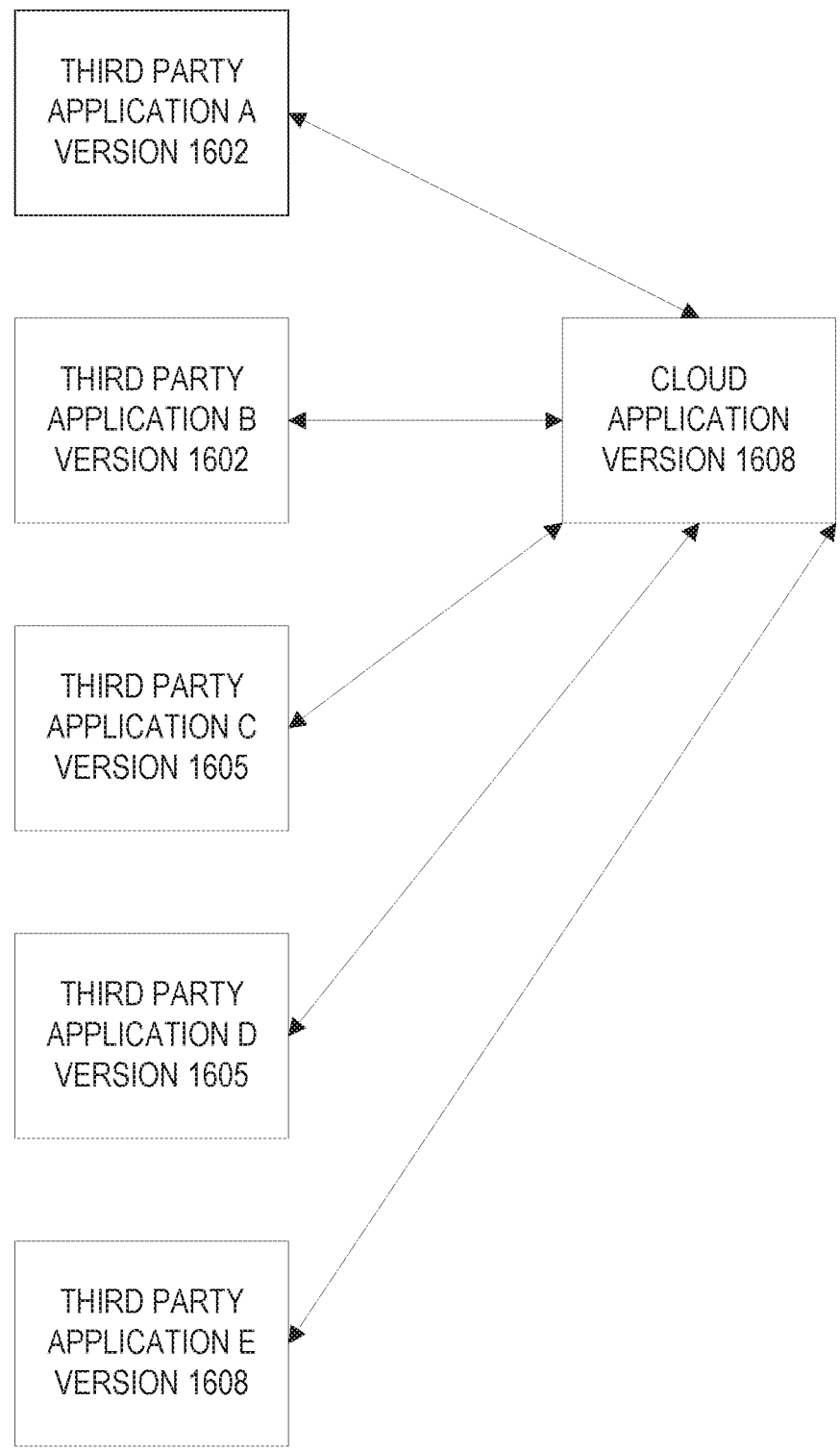

FIG. 2C shows that a new version 1608 has been released. The cloud application contains the instructions for the latest version 1608. Third party application A and third party application B remain in version 1602. Third party application C and third party application D remain with the prior version 1605. And new third party application E has installed the application, and thus has the latest version 1608.

As can be seen in this example, there can be a number of different versions of an application that need to be maintained at any given time. Managing multiple versions of cloud-based applications and on-premise applications can get incredibly complicated when each entity is using a different version of the application, especially in larger systems where there may be hundreds of entities.

To address such technical challenges, example embodiments provide for a single version of a cloud-based application to be maintained that can provide application services for all on-premise applications regardless of which version the on-premise application is utilizing. Each time a new feature is added to the cloud-based application, it is associated with a unique feature identifier and a unique version identifier and added to the instructions in the cloud-based application. A version identifier may be associated with one or more feature identifiers. For example, two new features may be added to version 1605, Feature A and Feature B. And, two new features may be added to version 1068, Feature C and Feature D. The naming convention for these features may be 1605_FeatureA and 1605_FeatureB, and 1608_Feature C and 1608_Feature D. The naming convention for each feature may be associated with instructions to be executed for that feature. Accordingly, when the cloud application receives a request for a particular feature, it can execute the instructions for that feature based on the version of the application used by the entity making the request. For example, the following instructions will be executed in response to a request for Feature A from an on-premise application with version 1605 or higher:

```
If version >= 1605_Feature A
then do [instructions for Feature A...]
end
```

In this way the cloud-based application may include instructions for multiple versions of applications and multiple features in one single instruction set.

Another technical challenge to managing multiple versions of an application is how to manage enhancements or bug fixes for an existing feature. For example, Feature A may need a bug fix or an enhancement to support a new device type, etc. In one example, Feature A may be for mobile payment functionality and need an enhancement to support devices in China. Feature A cannot simply be updated because the system needs to maintain backward compatibility for older versions that are used by administrators that do not want any changes to the application to avoid any compatibility issues. Embodiments of the invention allow the Feature A to be updated or enhanced for the latest version of the application but remain stable for the older versions.

For example, Feature A was first introduced in version 1605. The instructions from 1605_FeatureA can be copied to the latest version 1608_FeatureA and the enhancement made to 1608_FeatureA. In this way, all versions 1608 and higher can take advantage of the enhancement made to Feature A and Feature A will stay the same for application version 1605. Moreover, the naming convention for the instructions for 1605_FeatureA may be changed to indicate that the feature is obsolete in future versions. For example, the naming convention may be changed to 1605_OBL_FeatureA. In the future when version 1605 is no longer supported by the cloud application, these instructions may be easily found and deleted because they are no longer needed. For example, the system can search for any features designated OBL for version 1605 and delete the subset of instructions associated with the OBL feature(s) for version 1605. In this way the instructions may be easily cleaned up and kept to a manageable size.

Using the example from FIG. 2C, third party application A and third party application B are using version 1602. Since Feature A was introduced in version 1605, third party application A and B would not be affected by any change to Feature A. Third party application C and third party application D are both using version 1605, and since the instructions for Feature A for version 1605 were not changed, third party applications C and D are also not affected by any change to Feature A. Third party application E, however, is using version 1608, and thus, third party application E would be using the enhanced Feature A.

Figure 3:
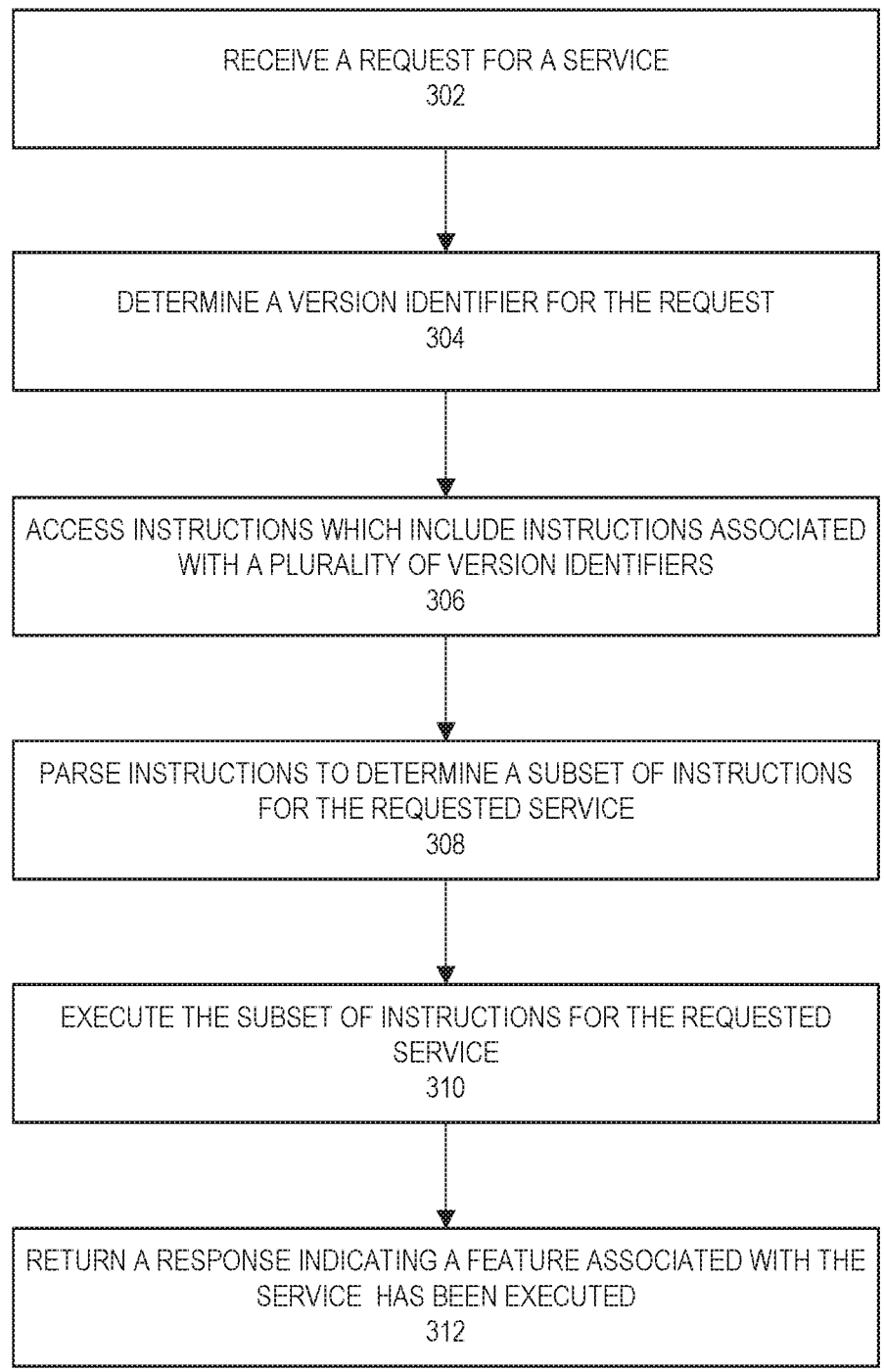
FIG. 3 is a flowchart illustrating aspects of a method, according to some example embodiments, for receiving and processing requests for application services.

FIG. 3 is a flow chart illustrating aspects of a method 300, according to some example embodiments, for receiving and processing requests for application services. For illustrative purposes, method 300 is described with respect to the networked system 100 of FIG. 1. It is to be understood that method 300 may be practiced with other system configurations in other embodiments.

In operation 302, the server system 102 (e.g., via API server 120) receives a request for a service. For example, the API server 120 may receive a request from a requesting device associated with an on-premise application (e.g., from a third party server 130 via a third party application 132) via a network for at least one feature associated with an application service provided by a cloud-based application. The request may be sent via HTTP, HTTPS, or other protocol. The request may include a requester identifier and a requested feature identifier. The requester identifier may be associated with a particular entity. The requested feature identifier may be associated with a particular application service, feature, or functionality that is requested by the third party server 130 via the third party application 132.

In operation 304, the server system 102 (e.g., via API server 120) determines a version identifier for the request based on the requester identifier. For example, the API server 120 may compare the requester identifier to a plurality of requester identifiers stored in one or more databases 126 to determine the version identifier associated with the requester identifier. The server system 102 (e.g., via application server 122) may access instructions for the cloud-based application which include instructions associated with a plurality of version identifiers, as shown in operation 306. Each version identifier may be associated with at least one feature identifier. Using the examples discussed previously, a version 1605 may include a Feature A and a Feature B.

The server system 102 (e.g., via application server 122) may parse the instructions for the cloud-based application to determine a subset of instructions for the requested application service, as shown in operation 308. For example, the application server 122 may parse the instructions to determine a subset of instructions associated with the version identifier (e.g., 1605) and the feature identifier (e.g., Feature A). In one example, the instructions may be structured as follows:

```
If version >= 1605_Feature A
then do [instructions for Feature A...]
end
```

In another example, the instructions may be structured as follows:

```
If version = 1605_OBL_Feature A
then do [instructions for Feature A...]
end
```

As explained above, the latter example may indicate that this feature (Feature A) is obsolete in later versions.

In operation 310, the application server 122 executes the subset of instructions. For example, the application server 122 would determine that since the version identifier is 1605 and the feature is Feature A, it should execute one of the above example instructions. The server system 102 (e.g., via API server 120) returns a response to the requesting device via the network, indicating that at least one feature associated with the application service provided by the cloud-based application has been executed, as shown in operation 312. The response may be sent via HTTP, HTTPS, or other protocol.

As explained above, instructions for new features and new versions may be stored in the instructions. For example, the server system 102 (e.g., via application server 122) may store in the instructions for the cloud-based application, a new subset of instructions associated with a new feature identifier (e.g., Feature C) and a new version identifier (e.g., 1608).

As also explained above, bug fixes or enhancements may be made to existing features. Accordingly, the server system 102 (e.g., via application server 122) may store, in the instructions for the cloud-based application, a new subset of instructions associated with at least one enhancement to an existing feature with an existing feature identifier Feature A) and an existing version identifier (e.g., 1605), and associate the new subset of instructions with the existing feature identifier (e.g., Feature A) and a new version identifier (e.g., 1608). The at least one enhancement may include a bug fix to the instructions associated with the existing feature or additional functionality to the instructions associated with the existing feature. The existing feature identifier associated with the existing version identifier may be updated to indicate that the existing feature is obsolete in instructions with later version identifiers (e.g., 1605_OBL_FeatureA).

Figure 4:
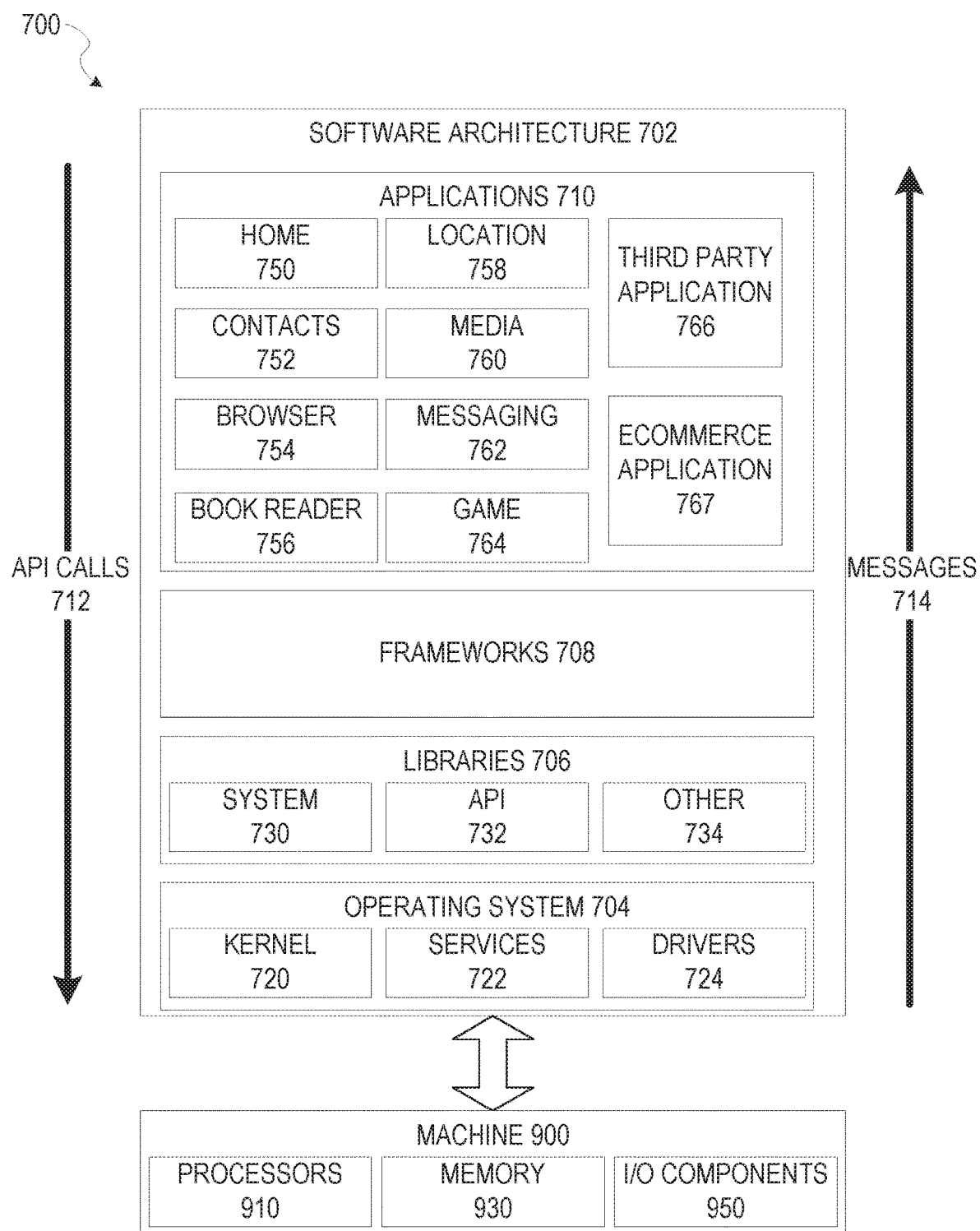
FIG. 4 is a block diagram illustrating an example of a software architecture that may be installed on a machine, according to some example embodiments.

FIG. 4 is a block diagram 700 illustrating software architecture 702, which can be installed on any one or more of the devices described above. For example, in various embodiments, client devices 110, server system 102 (including API server 120 and application server 122), and third party server(s) 130, may be implemented using some or all of the elements of software architecture 702. FIG. 4 is merely a non-limiting example of a software architecture, and it will be appreciated that many other architectures can be implemented to facilitate the functionality described herein. In various embodiments, the software architecture 702 is implemented by hardware such as machine 900 of FIG. 5 that includes processors 910, memory 930, and I/O components 950. In this example, the software architecture 702 can be conceptualized as a stack of layers where each layer may provide a particular functionality. For example, the software architecture 702 includes layers such as an operating system 704, libraries 706, frameworks 708, and applications 710. Operationally, the applications 710 invoke application programming interface (API) calls 712 through the software stack and receive messages 714 in response to the API calls 712, consistent with some embodiments.

In various implementations, the operating system 704 manages hardware resources and provides common services. The operating system 704 includes, for example, a kernel 720, services 722, and drivers 724. The kernel 720 acts as an abstraction layer between the hardware and the other software layers, consistent with some embodiments. For example, the kernel 720 provides memory management, processor management (e.g., scheduling), component management, networking, and security settings, among other functionality. The services 722 can provide other common services for the other software layers. The drivers 724 are responsible for controlling or interfacing with the underlying hardware, according to some embodiments. For instance, the drivers 724 can include display drivers, camera drivers, BLUETOOTH® or BLUETOOTH® Low Energy drivers, flash memory drivers, serial communication drivers (e.g., Universal Serial Bus (USB) drivers), WI-FI® drivers, audio drivers, power management drivers, and so forth.

In some embodiments, the libraries 706 provide a low-level common infrastructure utilized by the applications 710. The libraries 706 can include system libraries 730 (e.g., C standard library) that can provide functions such as memory allocation functions, string manipulation functions, mathematic functions, and the like. In addition, the libraries 706 can include API libraries 732 such as media libraries (e.g., libraries to support presentation and manipulation of various media formats such as Moving Picture Experts Group-4 (MPEG4), Advanced Video Coding (11264 or AVC), Moving Picture Experts Group Layer-3 (MP3), Advanced Audio Coding (AAC), Adaptive Multi-Rate (AMR) audio codec, Joint Photographic Experts Group (JPEG or JPG), or Portable Network Graphics (PNG)), graphics libraries (e.g., an OpenGL framework used to render in two dimensions (2D) and three dimensions (3D) in graphic content on a display), database libraries (e.g., SQLite to provide various relational database functions), web libraries (e.g., WebKit to provide web browsing functionality), and the like. The libraries 706 can also include a wide variety of other libraries 734 to provide many other APIs to the applications 710.

The frameworks 708 provide a high-level common infrastructure that can be utilized by the applications 710, according to some embodiments. For example, the frameworks 708 provide various graphic user interface (GUI) functions, high-level resource management, high-level location services, and so forth. The frameworks 708 can provide a broad spectrum of other APIs that can be utilized by the applications 710, some of which may be specific to a particular operating system 704 or platform.

In an example embodiment, the applications 710 include a home application 750, a contacts application 752, a browser application 754, a book reader application 756, a location application 758, a media application 760, a messaging application 762, a game application 764, and a broad assortment of other applications such as a third party applications 766. According to some embodiments, the applications 710 are programs that execute functions defined in the programs. Various programming languages can be employed to create one or more of the applications 710, structured in a variety of manners, such as object-oriented programming languages (e.g., Objective-C, Java, or C++) or procedural programming languages (e.g., C or assembly language). In a specific example, the third party application 766 (e.g., an application developed using the ANDROID™ or IOS™ software development kit (SDK) by an entity other than the vendor of the particular platform) may be mobile software running on a mobile operating system such as IOS™, ANDROID™, WINDOWS® Phone, or another mobile operating system. In this example, the third party application 766 can invoke the API calls 712 provided by the operating system 704 to facilitate functionality described herein.

Some embodiments may particularly include an ecommerce application 767. In certain embodiments, this may be a stand-alone application that operates to manage communications with a server system such as third party server(s) 130 or server system 102. In other embodiments, this functionality may be integrated with another application such as a website or application that provides products and services, etc. Ecommerce application 767 may request and display various information related to payment transactions, products and services, etc. and may provide the capability for a user to input data related to payment transactions (for example) via a touch interface, keyboard, or using a camera device of machine 900, communication with a server system via I/O components 950, and receipt and storage of payment related data in memory 930. Presentation of payment transactions and other information and user inputs associated with payment information may be managed by ecommerce application 767 using different frameworks 708, library 706 elements, or operating system 704 elements operating on a machine 900.

Figure 5:
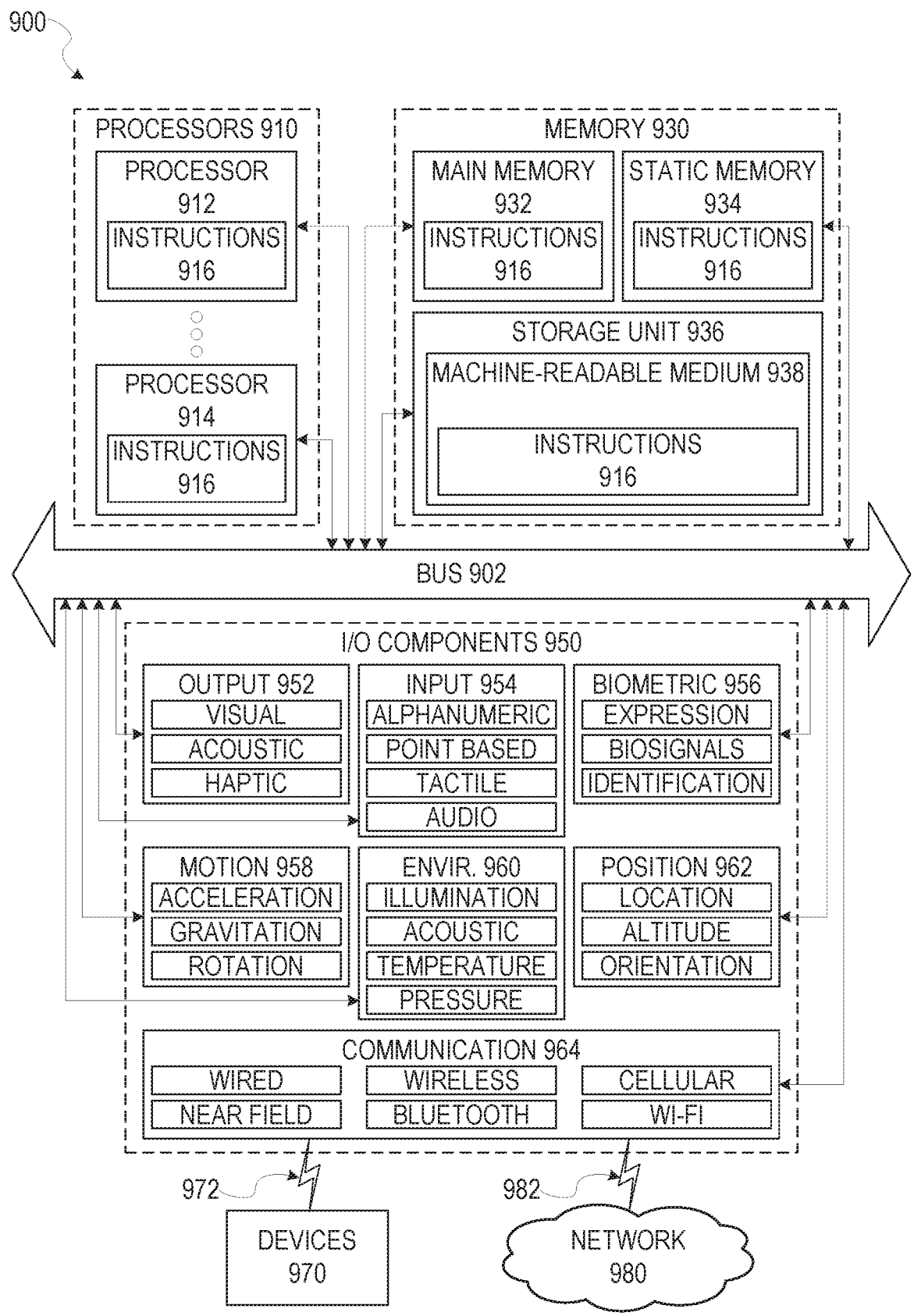
FIG. 5 illustrates a diagrammatic representation of a machine, in the form of a computer system, within which a set of instructions may be executed for causing the machine to perform any one or more of the methodologies discussed herein, according to an example embodiment.

FIG. 5 is a block diagram illustrating components of a machine 900, according to some embodiments, able to read instructions from a machine-readable medium (e.g., a machine-readable storage medium) and perform any one or more of the methodologies discussed herein. Specifically, FIG. 5 shows a diagrammatic representation of the machine 900 in the example form of a computer system, within which instructions 916 (e.g., software, a program, an application 710, an applet, an app, or other executable code) for causing the machine 900 to perform any one or more of the methodologies discussed herein can be executed. In alternative embodiments, the machine 900 operates as a standalone device or can be coupled (e.g., networked) to other machines. In a networked deployment, the machine 900 may operate in the capacity of a server machine 130, 102, 120, 122, etc. or a client device 110 in a server-client network environment, or as a peer machine in a peer-to-peer (or distributed) network environment. The machine 900 can comprise, but not be limited to, a server computer, a client computer, a personal computer (PC), a tablet computer, a laptop computer, a netbook, a personal digital assistant (PDA), an entertainment media system, a cellular telephone, a smart phone, a mobile device, a wearable device (e.g., a smart watch), a smart home device (e.g., a smart appliance), other smart devices, a web appliance, a network router, a network switch, a network bridge, or any machine capable of executing the instructions 916, sequentially or otherwise, that specify actions to be taken by the machine 900. Further, while only a single machine 900 is illustrated, the term "machine" shall also be taken to include a collection of machines 900 that individually or jointly execute the instructions 916 to perform any one or more of the methodologies discussed herein.

In various embodiments, the machine 900 comprises processors 910, memory 930, and I/O components 950, which can be configured to communicate with each other via a bus 902. In an example embodiment, the processors 910 (e.g., a central processing unit (CPU), a reduced instruction set computing (RISC) processor, a complex instruction set computing (CISC) processor, a graphics processing unit (GPU), a digital signal processor (DSP), an application specific integrated circuit (ASIC), a radio-frequency integrated circuit (RFIC), another processor, or any suitable combination thereof) include, for example, a processor 912 and a processor 914 that may execute the instructions 916. The term "processor" is intended to include multi-core processors 910 that may comprise two or more independent processors 912, 914 (also referred to as "cores") that can execute instructions 916 contemporaneously. Although FIG. 5 shows multiple processors 910, the machine 900 may include a single processor 910 with a single core, a single processor 910 with multiple cores (e.g., a multi-core processor 910), multiple processors 912, 914 with a single core, multiple processors 912, 914 with multiples cores, or any combination thereof.

The memory 930 comprises a main memory 932, a static memory 934, and a storage unit 936 accessible to the processors 910 via the bus 902, according to some embodiments. The storage unit 936 can include a machine-readable medium 938 on which are stored the instructions 916 embodying any one or more of the methodologies or functions described herein. The instructions 916 can also reside, completely or at least partially, within the main memory 932, within the static memory 934, within at least one of the processors 910 (e.g., within the processor's cache memory), or any suitable combination thereof, during execution thereof by the machine 900. Accordingly, in various embodiments, the main memory 932, the static memory 934, and the processors 910 are considered machine-readable media 938.

As used herein, the term "memory" refers to a machine-readable medium 938 able to store data temporarily or permanently and may be taken to include, but not be limited to, random-access memory (RAM), read-only memory (ROM), buffer memory, flash memory, and cache memory. While the machine-readable medium 938 is shown, in an example embodiment, to be a single medium, the term "machine-readable medium" should be taken to include a single medium or multiple media (e.g., a centralized or distributed database, or associated caches and servers) able to store the instructions 916. The term "machine-readable medium" shall also be taken to include any medium, or combination of multiple media, that is capable of storing instructions (e.g., instructions 916) for execution by a machine (e.g., machine 900), such that the instructions 916, when executed by one or more processors of the machine 900 (e.g., processors 910), cause the machine 900 to perform any one or more of the methodologies described herein. Accordingly, a "machine-readable medium" refers to a single storage apparatus or device, as well as "cloud-based" storage systems or storage networks that include multiple storage apparatus or devices. The term "machine-readable medium" shall accordingly be taken to include, but not be limited to, one or more data repositories in the form of a solid-state memory (e.g., flash memory), an optical medium, a magnetic medium, other non-volatile memory (e.g., erasable programmable read-only memory (EPROM)), or any suitable combination thereof. The term "machine-readable medium" specifically excludes non-statutory signals per se.

The I/O components 950 include a wide variety of components to receive input, provide output, produce output, transmit information, exchange information, capture measurements, and so on. In general, it will be appreciated that the I/O components 950 can include many other components that are not shown in FIG. 9. The I/O components 950 are grouped according to functionality merely for simplifying the following discussion, and the grouping is in no way limiting. In various example embodiments, the I/O components 950 include output components 952 and input components 954. The output components 952 include visual components (e.g., a display such as a plasma display panel (PDP), a light emitting diode (LED) display, a liquid crystal display (LCD), a projector, or a cathode ray tube (CRT)), acoustic components (e.g., speakers), haptic components (e.g., a vibratory motor), other signal generators, and so forth. The input components 954 include alphanumeric input components (e.g., a keyboard, a touch screen configured to receive alphanumeric input, a photo-optical keyboard, or other alphanumeric input components), point-based input components (e.g., a mouse, a touchpad, a trackball, a joystick, a motion sensor, or other pointing instruments), tactile input components (e.g., a physical button, a touch screen that provides location and force of touches or touch gestures, or other tactile input components), audio input components (e.g., a microphone), and the like.

In some further example embodiments, the I/O components 950 include biometric components 956, motion components 958, environmental components 960, or position components 962, among a wide array of other components. For example, the biometric components 956 include components to detect expressions (e.g., hand expressions, facial expressions, vocal expressions, body gestures, or eye tracking), measure biosignals (e.g., blood pressure, heart rate, body temperature, perspiration, or brain waves), identify a person (e.g., voice identification, retinal identification, facial identification, fingerprint identification, or electroencephalogram based identification), and the like. The motion components 958 include acceleration sensor components (e.g., accelerometer), gravitation sensor components, rotation sensor components (e.g., gyroscope), and so forth. The environmental components 960 include, for example, illumination sensor components (e.g., photometer), temperature sensor components (e.g., one or more thermometers that detect ambient temperature), humidity sensor components, pressure sensor components (e.g., barometer acoustic sensor components (e.g., one or more microphones that detect background noise), proximity sensor components (e.g., infrared sensors that detect nearby objects), gas sensor components e.g., machine olfaction detection sensors, gas detection sensors to detect concentrations of hazardous gases for safety or to measure pollutants in the atmosphere), or other components that may provide indications, measurements, or signals corresponding to a surrounding physical environment. The position components 962 include location sensor components (e.g., a Global Positioning System (GPS) receiver component), altitude sensor components (e.g., altimeters or barometers that detect air pressure from which altitude may be derived), orientation sensor components (e.g., magnetometers), and the like.

Communication can be implemented using a wide variety of technologies. The I/O components 950 may include communication components 964 operable to couple the machine 900 to a network 980 or devices 970 via a coupling 982 and a coupling 972, respectively. For example, the communication components 964 include a network interface component or another suitable device to interface with the network 980. In further examples, communication components 964 include wired communication components, wireless communication components, cellular communication components, near field communication (NFC) components, BLUETOOTH® components (e.g., BLUETOOTH® Low Energy), WI-FI® components, and other communication components to provide communication via other modalities. The devices 970 may be another machine 900 or any of a wide variety of peripheral devices (e.g., a peripheral device coupled via a Universal Serial Bus (USB)).

Moreover, in some embodiments, the communication components 964 detect identifiers or include components operable to detect identifiers. For example, the communication components 964 include radio frequency identification (RFID) tag reader components, NFC smart tag detection components, optical reader components (e.g., an optical sensor to detect a one-dimensional bar codes such as a Universal Product Code (UPC) bar code, multi-dimensional bar codes such as a Quick Response (QR) code, Aztec Code, Data Matrix, Dataglyph, MaxiCode, PDF417, Ultra Code, Uniform Commercial Code Reduced Space Symbology (UCC RSS)-2D bar codes, and other optical codes), acoustic detection components (e.g., microphones to identify tagged audio signals), or any suitable combination thereof. In addition, a variety of information can be derived via the communication components 964, such as location via Internet Protocol (IP) geo-location, location via WI-FI® signal triangulation, location via detecting a BLUETOOTH® or NFC beacon signal that may indicate a particular location, and so forth.

In various example embodiments, one or more portions of the network 980 can be an ad hoc network, an intranet, an extranet, a virtual private network (VPN), a local area network (LAN), a wireless LAN (WLAN), a wide area network (WAN), a wireless WAN (WWAN), a metropolitan area network (MAN), the Internet, a portion of the Internet, a portion of the public switched telephone network (PSTN), a plain old telephone service (POTS) network, a cellular telephone network, a wireless network, a WI-FI® network, another type of network, or a combination of two or more such networks. For example, the network 980 or a portion of the network 980 may include a wireless or cellular network, and the coupling 982 may be a Code Division Multiple Access (CDMA) connection, a Global System for Mobile communications (GSM) connection, or another type of cellular or wireless coupling. In this example, the coupling 982 can implement any of a variety of types of data transfer technology, such as Single Carrier Radio Transmission Technology (1×RTT), Evolution-Data Optimized (EVDO) technology, General Packet Radio Service (GPRS) technology, Enhanced Data rates for GSM Evolution (EDGE) technology, third Generation Partnership Project (3GPP) including 3G, fourth generation wireless (4G) networks, Universal Mobile Telecommunications System (UMTS), High Speed Packet Access (HSPA), Worldwide Interoperability for Microwave Access (WiMAX), Long Term Evolution (LTE) standard, others defined by various standard-setting organizations, other long range protocols, or other data transfer technology.

In example embodiments, the instructions 916 are transmitted or received over the network 980 using a transmission medium via a network interface device (e.g., a network interface component included in the communication components 964) and utilizing any one of a number of well-known transfer protocols (e.g., Hypertext Transfer Protocol (HTTP)). Similarly, in other example embodiments, the instructions 916 are transmitted or received using a transmission medium via the coupling 972 (e.g., a peer-to-peer coupling) to the devices 970. The term "transmission medium" shall be taken to include any intangible medium that is capable of storing, encoding, or carrying the instructions 916 for execution by the machine 900, and includes digital or analog communications signals or other intangible media to facilitate communication of such software.

Furthermore, the machine-readable medium 938 is non-transitory (in other words, not having any transitory signals) in that it does not embody a propagating signal. However, labeling the machine-readable medium 938 "non-transitory" should not be construed to mean that the medium is incapable of movement; the medium 938 should be considered as being transportable from one physical location to another. Additionally, since the machine-readable medium 938 is tangible, the medium 938 may be considered to be a machine-readable device.

The following enumerated embodiments describe various embodiments of methods, machine-readable media, and systems (e.g., machines, devices, or other apparatus) discussed herein.

A first embodiment provides a method comprising: receiving, by a server computer associated with a cloud-based application, a request via a network from a requesting device associated with an on-premise application, for at least one feature associated with an application service provided by the cloud-based application, the request including a requester identifier and a requested feature identifier; determining, by the server computer associated with the cloud-based application, a version identifier for the request based on the requester identifier; accessing, by the server computer associated with the cloud-based application, instructions for the cloud-based application which include instructions associated with a plurality of version identifiers, each version identifier associated with at least one feature identifier; parsing, by the server computer associated with the cloud-based application, the instructions for the cloud-based application to determine a subset of instructions associated with the version identifier of the request and the requested feature identifier; executing, by the server computer associated with the cloud-based application, the subset of instructions associated with the version identifier of the request and the requested feature identifier; and returning, by the server computer associated with the cloud-based application, a response to the requesting device via the network, indicating that at least one feature associated with the application service provided by the cloud-based application has been executed.

A second embodiment provides a method according to the first embodiment, the method further comprising: storing, in the instructions for the cloud-based application, a new subset of instructions associated with a new feature identifier and a new version identifier.

A third embodiment provides a method according to any one of the previously described embodiments, the method further comprising: storing, in the instructions for the cloud-based application, a new subset of instructions associated with at least one enhancement to an existing feature with an existing feature identifier and an existing version identifier, and associating the new subset of instructions with the existing feature identifier and a new version identifier.

A fourth embodiment provides a method according to any one of the previously described embodiments, wherein the at least one enhancement includes a bug fix to instructions associated with the existing feature or additional functionality for the instructions associated with the existing feature.

A fifth embodiment provides a method according to any one of the previously described embodiments, wherein the existing feature identifier associated with the existing version identifier is updated to indicate that the existing feature is obsolete in instructions with later version identifiers.

A sixth embodiment provides a method according to any one of the previously described embodiments, wherein determining the version identifier for the request based on the requester identifier comprises comparing the requester identifier to requester identifiers in a database to determine the version identifier associated with the requester identifier.

A seventh embodiment provides a method according to any one of the previously described embodiments, wherein the request is received via HyperText Transport Protocol Secure (HTTPS).

An eighth embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations comprising: receiving a request via a network from a requesting device associated with an on-premise application, for at least one feature associated with an application service provided by the cloud-based application, the request including a requester identifier and a requested feature identifier; determining a version identifier for the request based on the requester identifier; accessing instructions for the cloud-based application which include instructions associated with a plurality of version identifiers, each version identifier associated with at least one feature identifier; parsing the instructions for the cloud-based application to determine a subset of instructions associated with the version identifier of the request and the requested feature identifier; executing the subset of instructions associated with the version identifier of the request and the requested feature identifier; and returning a response to the requesting device via the network, indicating that at least one feature associated with the application service provided by the cloud-based application has been executed.

A ninth embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations according to any one of the previously described embodiments, the operations further comprising: storing, in the instructions for the cloud-based application, a new subset of instructions associated with a new feature identifier and a new version identifier.

A tenth embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations according to any one of the previously described embodiments, the operations further comprising: storing, in the instructions for the cloud-based application, a new subset of instructions associated with at least one enhancement to an existing feature with an existing feature identifier and an existing version identifier, and associating the new subset of instructions with the existing feature identifier and a new version identifier.

An eleventh embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations according to any one of the previously described embodiments, wherein the at least one enhancement includes a bug fix to instructions associated with the existing feature or additional functionality for the instructions associated with the existing feature.

A twelfth embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations according to any one of the previously described embodiments, wherein the existing feature identifier associated with the existing version identifier is updated to indicate that the existing feature is obsolete in instructions with later version identifiers.

A thirteenth embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations according to any one of the previously described embodiments, wherein determining a version identifier for the request based on the requester identifier comprises comparing the requester identifier to requester identifiers in a database to determine the version identifier associated with the requester identifier.

A fourteenth embodiment provides a server computer associated with a cloud-based application comprising: one or more hardware processors; and a computer-readable medium coupled with the one or more processors, the computer-readable medium comprising instructions stored thereon that are executable by the one or more processors to cause the server computer to perform operations according to any one of the previously described embodiments, wherein the request is received via HyperText Transport Protocol Secure (HTTPS).

A fifteenth embodiment provides a non-transitory computer-readable medium comprising instructions stored thereon that are executable by at least one processor to cause a computing device to perform operations comprising: receiving a request via a network from a requesting device associated with an on-premise application, for at least one feature associated with an application service provided by a cloud-based application, the request including a requester identifier and a requested feature identifier; determining a version identifier for the request based on the requester identifier; accessing instructions for the cloud-based application which include instructions associated with a plurality of version identifiers, each version identifier associated with at least one feature identifier; parsing the instructions for the cloud-based application to determine a subset of instructions associated with the version identifier of the request and the requested feature identifier; executing the subset of instructions associated with the version identifier of the request and the requested feature identifier; and returning a response to the requesting device via the network, indicating that at least one feature associated with the application service provided by the cloud-based application has been executed.

A sixteenth embodiment provides a non-transitory computer-readable medium comprising instructions stored thereon that are executable by at least one processor to cause a computing device to perform operations according to any one of the previously described embodiments, the operations further comprising: storing, in the instructions for the cloud-based application, a new subset of instructions associated with a new feature identifier and a new version identifier.

A seventeenth embodiment provides a non-transitory computer-readable medium comprising instructions stored thereon that are executable by at least one processor to cause a computing device to perform operations according to any one of the previously described embodiments, the operations further comprising: storing, in the instructions for the cloud-based application, a new subset of instructions associated with at least one enhancement to an existing feature with an existing feature identifier and an existing version identifier, and associating the new subset of instructions with the existing feature identifier and a new version identifier.

An eighteenth embodiment provides a non-transitory computer-readable medium comprising instructions stored thereon that are executable by at least one processor to cause a computing device to perform operations according to any one of the previously described embodiments, wherein the at least one enhancement includes a bug fix to instructions associated with the existing feature or additional functionality for the instructions associated with the existing feature.

A nineteenth embodiment provides a non-transitory computer-readable medium comprising instructions stored thereon that are executable by at least one processor to cause a computing device to perform operations according to any one of the previously described embodiments, wherein the existing feature identifier associated with the existing version identifier is updated to indicate that the existing feature is obsolete in instructions with later version identifiers.

A twentieth embodiment provides a non-transitory computer-readable medium comprising instructions stored thereon that are executable by at least one processor to cause a computing device to perform operations according to any one of the previously described embodiments, wherein determining a version identifier for the request based on the requester identifier comprises comparing the requester identifier to requester identifiers in a database to determine the version identifier associated with the requester identifier.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Although an overview of the inventive subject matter has been described with reference to specific example embodiments, various modifications and changes may be made to these embodiments without departing from the broader scope of embodiments of the present disclosure The embodiments illustrated herein are described in sufficient detail to enable those skilled in the art to practice the teachings disclosed. Other embodiments may be used and derived therefrom, such that structural and logical substitutions and changes may be made without departing from the scope of this disclosure. The Detailed Description, therefore, is not to be taken in a limiting sense, and the scope of various embodiments is defined only by the appended claims, along with the full range of equivalents to which such claims are entitled.

As used herein, the term "or" may be construed in either an inclusive or exclusive sense. Moreover, plural instances may be provided for resources, operations, or structures described herein as a single instance. Additionally, boundaries between various resources, operations, modules, engines, and data stores are somewhat arbitrary, and particular operations are illustrated in a context of specific illustrative configurations. Other allocations of functionality are envisioned and may fall within a scope of various embodiments of the present disclosure. In general, structures and functionality presented as separate resources in the example configurations may be implemented as a combined structure or resource. Similarly, structures and functionality presented as a single resource may be implemented as separate resources. These and other variations, modifications, additions, and improvements fall within a scope of embodiments of the present disclosure as represented by the appended claims. The specification and drawings are, accordingly, to be regarded in an illustrative rather than a restrictive sense.

What is claimed is:

1. A method comprising:
    storing, by a server computer associated with a cloud-based application, an instruction set comprising instructions for the cloud-based application having a plurality of features corresponding to services provided by the cloud-based application and at least one subset of instructions for a first feature of the plurality of features corresponding to a first service provided by the cloud-based application, the first feature associated with a first feature identifier and a first version identifier;
    receiving, by the server computer associated with a cloud-based application, a new subset of instructions associated with at least one enhancement to the first service associated with the first feature identifier;
    storing, by the server computer associated with a cloud-based application, the new subset of instructions for the at least one enhancement to the first service in the instruction set comprising instructions for the cloud-based application and associating the new subset of instructions with the first feature identifier and a second version identifier;
    receiving, by the server computer associated with the cloud-based application, a request for the first service provided by the cloud-based application, from an on-premise application via a requesting device, the request including a requester identifier and a requested feature identifier corresponding to the first service;
    comparing, by the server computer associated with the cloud-based application, the requester identifier to a plurality of requester identifiers and associated version identifiers to determine a version identifier for the request;
    accessing, by the server computer associated with the cloud-based application, the instruction set comprising instructions for the cloud-based application which include instructions associated with a plurality of version identifiers, each version identifier associated with at least one feature identifier;
    parsing, by the server computer associated with the cloud-based application, the instructions for the cloud-based application to determine that the version identifier of the request and the requested feature identifier correspond to the subset of instructions associated with the first feature identifier and first version identifier for the first service, and not the subset of instructions associated with the first feature identifier and the second version identifier for the first service;
    executing, by the server computer associated with the cloud-based application, the subset of instructions associated with the first feature identifier and the first version identifier for the first service, based on the version identifier of the request and the requested feature identifier; and
    returning, by the server computer associated with the cloud-based application, a response to the requesting device via the network, indicating that the first service provided by the cloud-based application has been executed.

2. The method of claim 1, further comprising:
    storing, in the instructions for the cloud-based application, a new subset of instructions associated with a new feature identifier and a new version identifier.

3. The method of claim 1, wherein the at least one enhancement to the first service includes a bug fix to the subset of instructions associated with the first feature identifier or additional functionality for the subset of instructions associated with the first feature identifier.

4. The method of claim 1, wherein the first feature identifier associated with the first version identifier is updated to indicate that the first feature is obsolete in instructions with later version identifiers.

5. The method of claim 1, wherein the request is received via HyperText Transport Protocol Secure (HTTPS).

6. A server computer associated with a cloud-based application comprising:
one or more hardware processors; and
a computer-readable medium coupled with the one or more processors, the computer-readable medium comprising instructions stored thereon that are executable by the one or more processors to cause the server computer to perform operations comprising:
storing an instruction set comprising instructions for the cloud-based application having a plurality of features corresponding to services provided by the cloud-based application and at least one subset of instructions for a first feature of the plurality of features corresponding to a first service provided by the cloud-based application, the first feature associated with a first feature identifier and a first version identifier;
receiving a new subset of instructions associated with at least one enhancement to the first service associated with the first feature identifier;
storing the new subset of instructions for the at least one enhancement to the first service in the instruction set comprising instructions for the cloud-based application and associating the new subset of instructions with the first feature identifier and a second version identifier;
receiving a request for the first service provided by the cloud-based application, from an on-premise application via a requesting device, the request including a requester identifier and a requested feature identifier corresponding to the first service;
comparing the requester identifier to a plurality of requester identifiers and associated version identifiers to determine a version identifier for the request;
accessing the instruction set comprising instructions for the cloud-based application which include instructions associated with a plurality of version identifiers, each version identifier associated with at least one feature identifier;
parsing the instructions for the cloud-based application to determine that the version identifier of the request and the requested feature identifier correspond to the subset of instructions associated with the first feature identifier and first version identifier for the first service, and not the subset of instructions associated with the first feature identifier and the second version identifier for the first service;
executing the subset of instructions associated with the first feature identifier and the first version identifier for the first service, based on the version identifier of the request and the requested feature identifier; and
returning a response to the requesting device via the network, indicating that the first service provided by the cloud-based application has been executed.

7. The server computer of claim 6, operations further comprising:
storing, in the instructions for the cloud-based application, a new subset of instructions associated with a new feature identifier and a new version identifier.

8. The server computer of claim 6, wherein the at least one enhancement to the first service includes a bug fix to the subset of instructions associated with the first feature identifier or additional functionality for the subset of instructions associated with the first feature identifier.

9. The server computer of claim 6, wherein the first feature identifier associated with the first version identifier is updated to indicate that the first feature is obsolete in instructions with later version identifiers.

10. The server computer of claim 6, wherein the request is received via HyperText Transport Protocol Secure (HTTPS).

11. A non-transitory computer-readable medium comprising instructions stored thereon that are executable by at least one processor to cause a computing device to perform operations comprising:
storing an instruction set comprising instructions for the cloud-based application having a plurality of features corresponding to services provided by the cloud-based application and at least one subset of instructions for a first feature of the plurality of features corresponding to a first service provided by the cloud-based application, the first feature associated with a first feature identifier and a first version identifier;
receiving a new subset of instructions associated with at least one enhancement to the first service associated with the first feature identifier;
storing the new subset of instructions for the at least one enhancement to the first service in the instruction set comprising instructions for the cloud-based application and associating the new subset of instructions with the first feature identifier and a second version identifier;
receiving a request for the first service provided by the cloud-based application, from an on-premise application via a requesting device, the request including a requester identifier and a requested feature identifier corresponding to the first service;
comparing the requester identifier to a plurality of requester identifiers and associated version identifiers to determine a version identifier for the request;
accessing the instruction set comprising instructions for the cloud-based application which include instructions associated with a plurality of version identifiers, each version identifier associated with at least one feature identifier;
parsing the instructions for the cloud-based application to determine that the version identifier of the request and the requested feature identifier correspond to the subset of instructions associated with the first feature identifier and first version identifier for the first service, and not the subset of instructions associated with the first feature identifier and the second version identifier for the first service;
executing the subset of instructions associated with the first feature identifier and the first version identifier for the first service, based on the version identifier of the request and the requested feature identifier; and
returning a response to the requesting device via the network, indicating that the first service provided by the cloud-based application has been executed.

12. The non-transitory computer-readable medium of claim 11, the operations further comprising:
storing, in the instructions for the cloud-based application, a new subset of instructions associated with a new feature identifier and a new version identifier.

13. The non-transitory computer-readable medium of claim 11, wherein the at least one enhancement to the first service includes a bug fix to the subset of instructions associated with the first feature identifier or additional functionality for the subset of instructions associated with the first feature identifier.

14. The non-transitory computer-readable medium of claim 11, wherein the first feature identifier associated with the first version identifier is updated to indicate that the first feature is obsolete in instructions with later version identifiers.

15. The method of claim 1, wherein the instructions for the cloud-based application comprise a subset of instructions for each of the plurality of features corresponding to the services provided by the cloud-based application, including the subset of instructions for the first feature.

16. The method of claim 1, further comprising:
determining that a version of the first feature associated with the first version identifier is no longer supported by the cloud-based application; and
deleting the subset of instructions for the first feature associated with the first version identifier from the instruction set.

17. The method of claim 1, further comprising:
searching for features associated with a version identifier designated obsolete; and
deleting a subset of instructions for each feature associated with a version identifier designated obsolete.

18. The method of claim 1, wherein the response indicating that at least one feature associated with the application service provided by the cloud-based application has been executed, is sent via HTTP or HTTPS.

19. The server computer of claim 6, the operations further comprising:
determining that a version of the first feature associated with the first version identifier is no longer supported by the cloud-based application; and
deleting the subset of instructions for the first feature associated with the first version identifier from the instruction set.

20. The server computer of claim 6, operations further comprising:
searching for features associated with a version identifier designated obsolete; and
deleting a subset of instructions for each feature associated with a version identifier designated obsolete.

* * * * *